(12) United States Patent
Johnson

(10) Patent No.: US 8,298,103 B2
(45) Date of Patent: Oct. 30, 2012

(54) DETACHABLE HUB AND SPROCKET FOR USE WITH A MECHANICAL DRIVE TRANSMISSION OF AN AGRICULTURAL IMPLEMENT

(75) Inventor: Chad M. Johnson, Arlington Heights, IL (US)

(73) Assignee: CNH America LLC, New Holland, PA (US)

( * ) Notice: Subject to any disclaimer, the term of this patent is extended or adjusted under 35 U.S.C. 154(b) by 584 days.

(21) Appl. No.: 12/494,751

(22) Filed: Jun. 30, 2009

(65) Prior Publication Data
US 2010/0331128 A1   Dec. 30, 2010

(51) Int. Cl.
*F16H 7/24* (2006.01)
*F16H 55/30* (2006.01)

(52) U.S. Cl. .................................... 474/150; 474/158

(58) Field of Classification Search ............... 474/150, 474/158; 403/365; 74/112, 447; 242/608.5
See application file for complete search history.

(56) References Cited

U.S. PATENT DOCUMENTS

| | | | |
|---|---|---|---|
| 2,382,740 A * | 8/1945 | Noffsinger | 474/96 |
| 2,686,953 A * | 8/1954 | Pike | 28/297 |
| 2,691,491 A * | 10/1954 | Thalhammer | 242/586.6 |
| 2,932,207 A | 4/1960 | Whitney | |
| 3,239,159 A * | 3/1966 | Cohen | 242/608.5 |
| 3,519,037 A * | 7/1970 | Linkfield | 83/821 |
| 3,838,929 A | 10/1974 | Burrell | |
| 4,049,112 A | 9/1977 | Tyslauk | |
| 4,231,670 A | 11/1980 | Knoski | |
| 4,257,320 A | 3/1981 | Holbrook et al. | |
| 4,353,705 A | 10/1982 | Scott-Jackson et al. | |
| 4,416,650 A * | 11/1983 | Wilkins | 474/161 |
| 4,541,609 A | 9/1985 | Smith | |
| 5,121,701 A | 6/1992 | Reed et al. | |
| 5,263,575 A | 11/1993 | Ledet | |
| 5,389,044 A | 2/1995 | Bandy, Jr. et al. | |
| 5,393,271 A | 2/1995 | Sands | |
| 5,596,938 A | 1/1997 | Shaw | |
| 5,636,935 A | 6/1997 | Beerens | |
| 6,000,475 A | 12/1999 | Fabian et al. | |
| 6,581,535 B2 | 6/2003 | Barry et al. | |
| 2002/0178981 A1 | 12/2002 | Drummond et al. | |
| 2006/0252588 A1 | 11/2006 | Fandella | |

\* cited by examiner

*Primary Examiner* — Michael Mansen
*Assistant Examiner* — Robert T Reese
(74) *Attorney, Agent, or Firm* — Rebecca Henkel

(57) ABSTRACT

A sprocket and hub assembly for use with a mechanical drive assembly of an agricultural implement includes a generally flat disc having an outer edge and a generally center mount portion. A series of teeth are radially defined around the outer edge of the disc. The assembly further includes a hub removably mounted to the generally center mount portion of the disc. The hub has a shaft engagement portion for removably coupling the hub to a driven shaft of the mechanical drive assembly. In one embodiment, the agricultural implement includes a retainer designed to hold a set of differently sized sprockets that can be interchangeably coupled to the driven shaft by the hub.

19 Claims, 6 Drawing Sheets

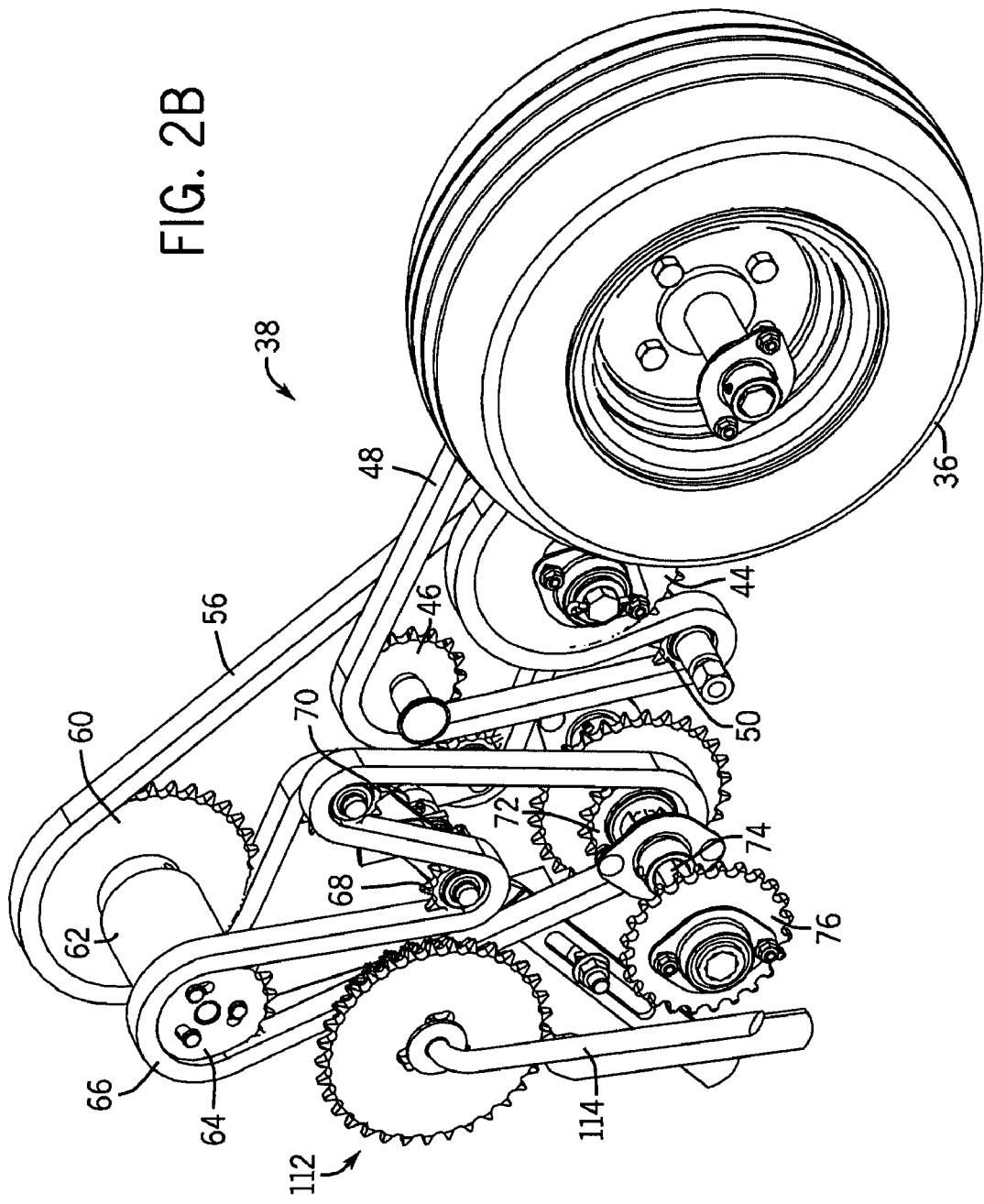

DETACHABLE HUB AND SPROCKET FOR USE WITH A MECHANICAL DRIVE TRANSMISSION OF AN AGRICULTURAL IMPLEMENT

BACKGROUND OF THE INVENTION

The present invention relates generally to agricultural implements and, more particularly, to a detachable hub and sprocket for use with the mechanical drive transmission of an agricultural implement.

Some agricultural implements, such as planters and seeders, have various systems or devices that are powered by power that is derived from rotation of a ground engaging wheel of the implement. For example, a planter will typically deposit seed as a function of the rotational speed of the ground engaging wheel. However, most planters will also include a mechanical drive system or transmission to provide some control in the seed deposition rate as a function of the rotational speed of the ground engaging wheel. In other words, the mechanical drive system will include an output shaft that interfaces with the seed metering or seed deposition system and a set of gears will be used to control the rotational speed of the output shaft relative to the speed of the ground engaging wheel.

In a typical arrangement, a chain or belt drive is used to rotate a driven shaft with rotation of the axle (drive shaft) of the ground engaging wheel. A sprocket (also referred to as a cog or gear ring) is mounted to each end of the driven shaft and the sprockets will typically have different diameters (gear ratios) so that the output shaft, which is connected to one of the sprockets by a chain drive, will rotate at a different rotational speed than the drive shaft. As known in the art, the gear ratios of the sprockets will dictate the relative differences in the rotational speed of the output shaft and the drive shaft. And, since the rotational speed of the output shaft dictates the rate by which seed or other particulate matter is deposited onto the planting surface, the gear ratios will also dictate the seed deposition rate.

Different types of seed and field conditions will often require different seed deposition rates. Therefore, a planter will often require a large number of gear ratios to achieve a large range of desired seed populations to accommodate variations in seed types and field conditions. Typically, a change in the drive ratio of the mechanical drive system is accomplished by swapping sprockets of different sizes from a collection or set of available and differently sized sprockets. Each sprocket has a disc portion, with a series of teeth formed on an outer edge thereof, and a hub for coupling the sprocket to the driven shaft. The hub, which is integrally formed with the disc portion, will typically have a hex shaped bore, a square shaped bore, or a keyway that allows the hub to interface with the driven shaft so that the shaft will rotate with rotation of the sprocket. As noted above, to accommodate variations in seed types and field conditions, several sprockets are required and are typically stored on the agricultural implement itself. While reasonably effective, the collective size of the sprockets can be substantial, especially on an agricultural implement with limited space for storage of unused equipment.

Therefore, there is a need in the art to reduce the size of the sprockets to reduce storage loads on the agricultural implement without sacrificing the variability afforded by having multiple sprockets for accommodating variations in seed types and field conditions.

SUMMARY OF THE INVENTION

The present invention is directed to a sprocket (or similar rotatable member, such as a pulley disc) and hub combination that allows the hub to be decoupled from the sprocket and, when desired, used with another sprocket of different size to change the drive ratio of a mechanical drive system of an agricultural implement. The invention therefore allows a set of hub-less sprockets to be stored flat against one another in a relatively compact and space saving manner on the agricultural implement. Additionally, the invention provides a manufacturing cost savings since only one hub is needed for a set of sprockets of various sizes (gear ratios).

It is therefore an object of the present invention to provide a set of hub-less sprockets that can be interchangeably mounted to a hub used to interconnect the sprocket to a shaft of the mechanical drive system of an agricultural implement.

It is another object of the present invention to provide a quick-change sprocket and hub combination that allows a user, such as a farmer, to make quick adjustments to the drive ratio of the mechanical drive system.

It is another object of the invention to provide a set of sprockets that can be stored flat against one another as a sprocket set on an agricultural implement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 2B is an isometric left side view of the mechanical drive system;

DETAILED DESCRIPTION OF THE INVENTION

Figure 1:
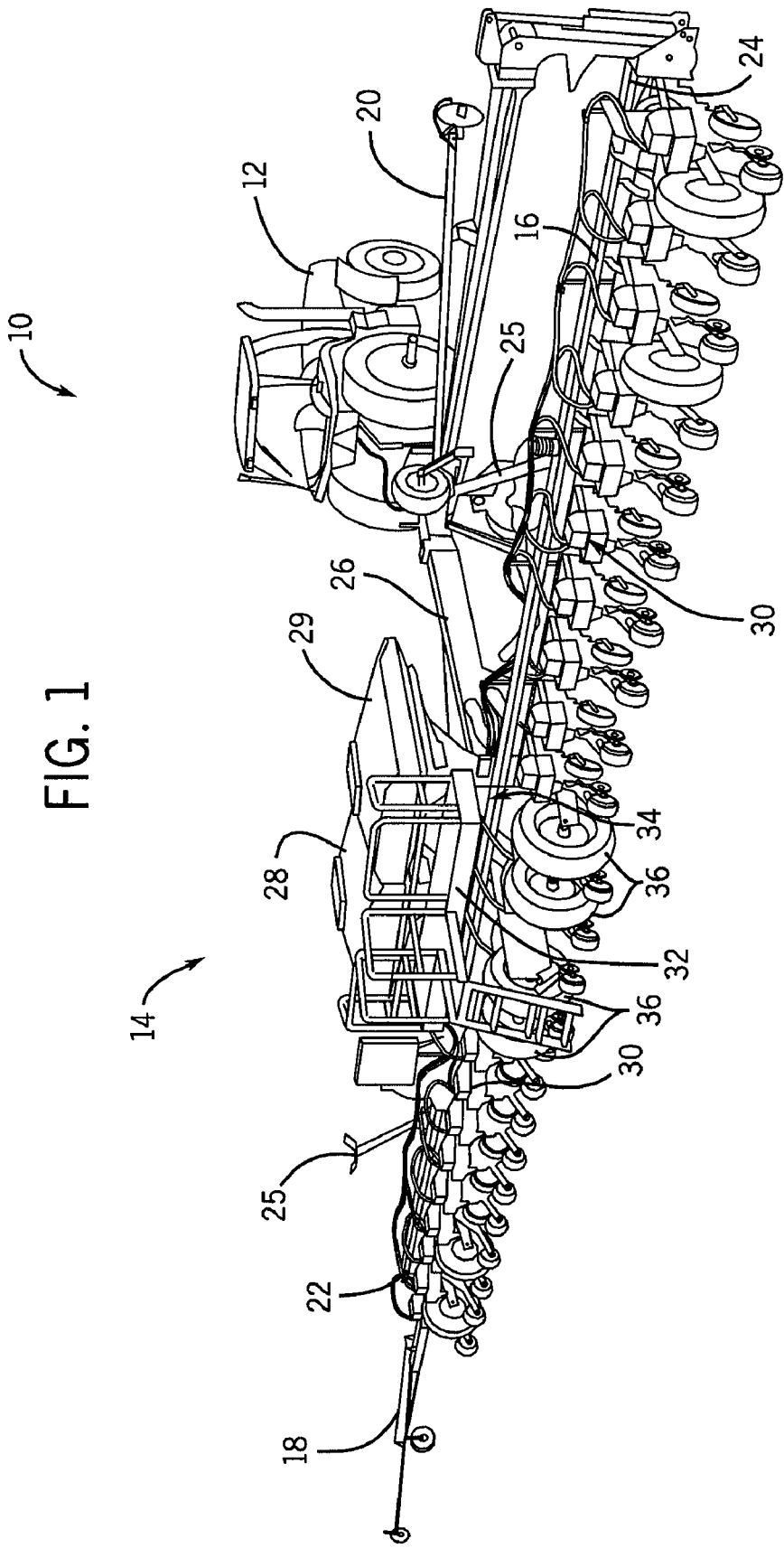
FIG. 1 is a pictorial view of a planter having a mechanical drive system incorporating a sprocket and hub according to one aspect of the present invention.

Referring now to the drawings, and more particularly to FIG. 1, there is shown an agricultural work system 10 that includes an agricultural work vehicle, such as tractor 12 that tows an agricultural implement 14, which is depicted as a multi-row front fold transport planter. Planter 14 can include a toolbar 16 with left and right marker assemblies 18, 20 that are attached to left and right ends 22, 24 of toolbar 16, respectively. Supports 25 can support marker assemblies 18, 20 when in a folded position.

Planter 14 can include other elements such as drawbar 26 for connection to tractor 12, large seed hoppers 28, 29 which provide seeds to row or seed units 30, and platform and gate assembly 32 for accessing and filling large seed hoppers 28, 29. Row or planting units 30 can include a variety of elements for dispensing seed, fertilizer, pesticide, herbicide and other agricultural materials. Such elements can include, but are not limited to, a furrow opening apparatus, gage wheels, a pair of lateral spaced, or staggered, furrow opener discs, or alternatively, and without detracting or departing from the spirit and scope of the present invention, a runner opener type for providing a furrow in the ground, a pair of furrow closer discs, a seed meter, a press wheel arranged in fore-and-aft relationship relative to each other, and a agricultural chemical hopper. Additionally, planter 14 can have planting units 30 with individual seed boxes in addition to the large seed hoppers 28, 29. Bulk fill hopper 28 holds seed for the seed units 30 mounted to the left wing of frame 16 and bulk fill hopper 29 holds seed for the seed units 30 mounted to the right wing of frame 16. Seed is metered from the bulk fill hoppers 28, 29 to the individual seed units by a seed metering system, generally designated by reference number 34, in a manner generally known in the art. The planter 14 is designed such that seed (or other particulate matter) is metered as a function of the rotational speed of ground engaging wheels 36.

Figure 2A:
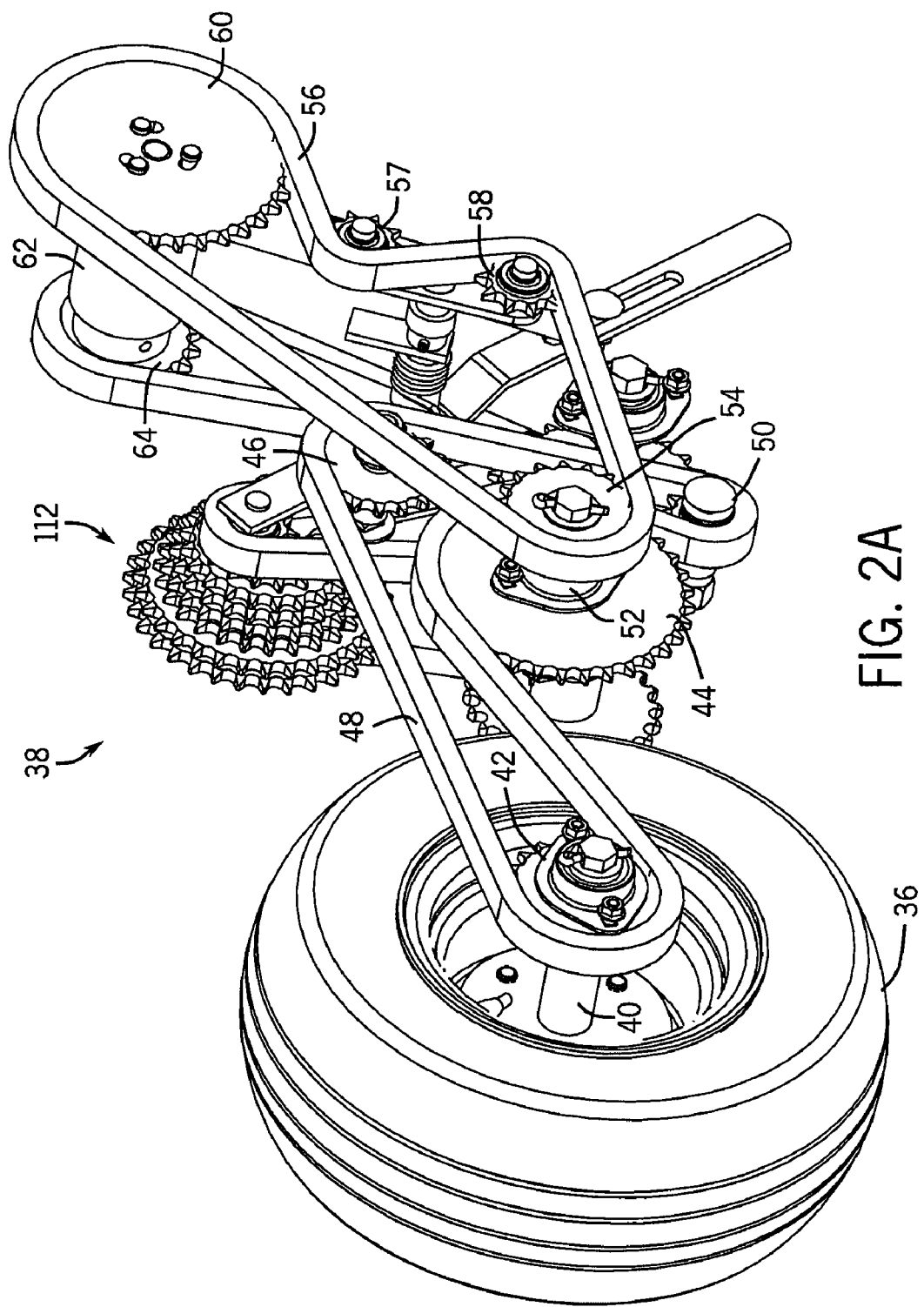
FIG. 2A is an isometric right side view of a mechanical drive system of the planter shown in FIG. 1.

A mechanical drive system 38, shown in FIGS. 2A and 2B, is designed to deliver mechanized power to the seed meting system 34 as a function of the rotational speed of ground engaging wheel 36 that rotates around an axle 40, which has a sprocket 42 coupled to an end thereof. The mechanical drive system 38 includes sprockets 44 and 46 which are rotated by chain 48 that is entrained around sprocket 44 and 46 and the sprocket 42 coupled to the drive shaft 40. Preferably, the chain 48 is also entrained around a tensioner 50. It will thus be appreciated that when the ground engaging wheel 36 is rotating, sprocket 42 will follow that rotation and cause translation of chain 48, which will in turn cause rotation of sprockets 44 and 46. Sprocket 44 is coupled to an inner end of shaft 52 and sprocket 54 is mounted to an opposite end of the shaft 52. Since sprocket 44 and sprocket 54 are mounted to a common shaft 50, shaft 54 will rotate with rotation of the ground engaging wheel 36. A drive chain 56 is entrained around sprocket 54 as well as tensioning sprockets 57, 58 and a removable drive sprocket 60. The construction of the removable drive sprocket 60 will be described in greater detail below.

As shown in FIG. 2B, the removable drive sprocket 60 is coupled to an end of a driven shaft 62 and thereby causes rotation of the driven shaft 62 when rotated by translation of drive chain 56. Coupled to the opposite end of the driven shaft 62 is removable driven sprocket 64. As will be described more fully below, sprockets 60 and 64 are designed to be quick-change sprockets that allow a user to replace the sprockets in a relatively quick manner with differently sized sprockets to vary the drive ratio of the drive assembly 38.

A driven chain 66 is entrained around the driven sprocket 64 and tension sprockets 68, 70 and an output shaft sprocket 72. The output shaft sprocket 72 is coupled to an output shaft 74 such that rotation of the sprocket 72 via translation of chain 66 causes rotation of the output shaft 74. The output shaft 74 also carries an output sprocket 76 that is designed to interface with a chain of the seed metering system 34 or other system. It will thus be appreciated that rotation of mechanical drive assembly 38 translates mechanized power derived from rotation of the ground engaging wheel 36 to the seed metering system 34 or other system of the agricultural implement. Moreover, it will be appreciated that the rotational speed of the output sprocket 76 can be varied by replacing the drive sprocket 60 and/or driven sprocket 64 with a differently sized sprocket, e.g., a sprocket with a different gear ratio. As noted above, conventionally, replacing the sprockets has required decoupling of the sprocket and its hub from respective ends of the driven shaft. However, as will be described below, the present invention simplifies such replacement.

Figure 3:
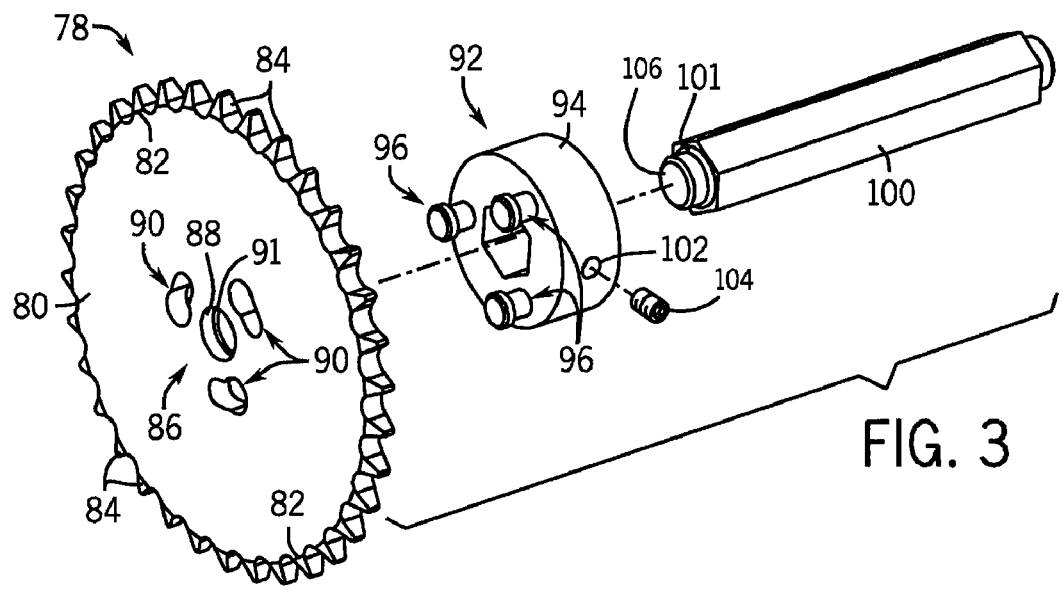
FIG. 3 is an exploded view of the interconnection of a sprocket and hub to a driven shaft of the mechanical drive system.

Referring now to FIG. 3, the present invention provides a sprocket and hub design that allows the sprocket to be removed from the hub, or vice-versa. It will be understood that that the drive sprocket and the driven sprocket described above can each have a similar construction and, as such, the description of the sprocket 78 shown in FIG. 3 will be understood to cover the construction and design of both the drive and driven sprockets. Sprocket 78 has a generally planar disc shaped body 80 with a peripheral edge 82 around which a series of teeth 84 are extend. A hub mounting portion 86 is formed in the center of the body 80 and includes a central bore 88 and a set of spaced keyways 90. In a preferred embodiment, the bore 88 includes a chamfer wall 91, the significance of which will be described below.

Figure 5:
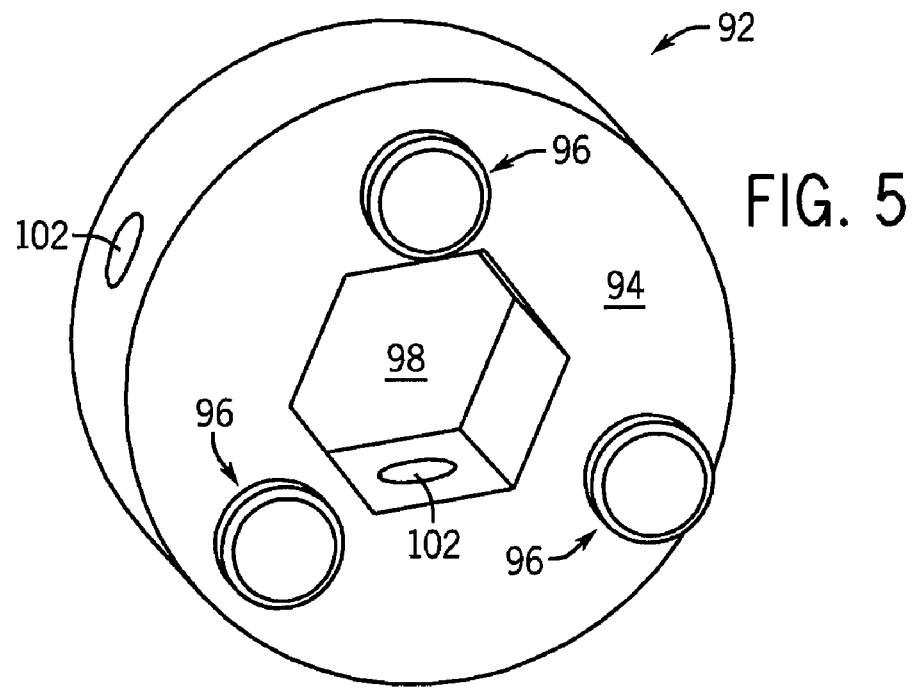
FIG. 5 is an isometric view of the hub of FIG. 3.
Figure 6:
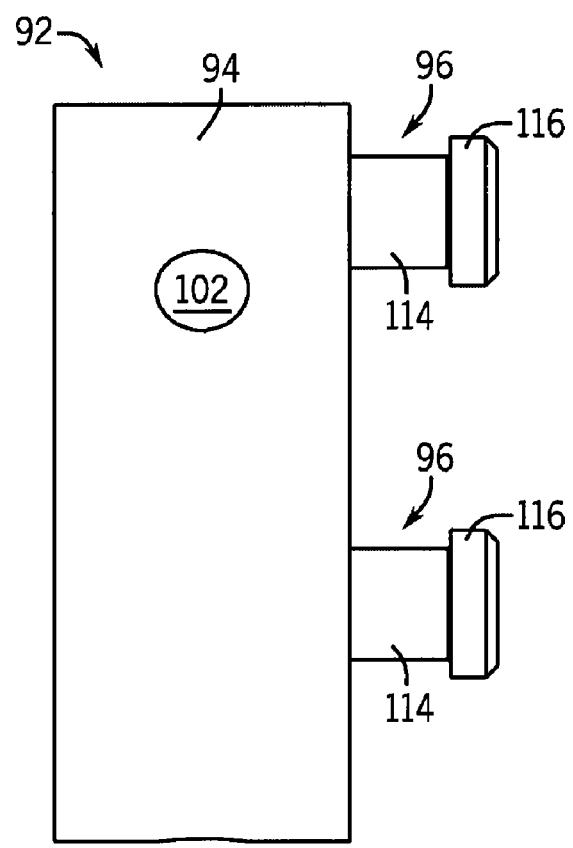
FIG. 6 is a side elevation view of the hub of FIG. 3.

A hub 92 has a generally cylindrical body 94 from which a set of pins 96 outwardly extend. A bore 98 (FIG. 5) extends centrally through the hub body 94 which allows the hub 92 to be fit over an end of a shaft 100, such as driven shaft 62. In a preferred embodiment, an opening 102, generally transverse to bore 98 is formed in the hub body 94, as shown in FIGS. 5 and 6, and is adapted to receive a set screw 104 for retaining the hub 92 around the end of the shaft 100. The bore 98 shown in the figures has a hexagonal profile and is thus shaped to receive a shaft 100 having a similar hexagonal profile, but it is understood that the bore could be shaped to mate with shafts having differently shaped profiles. Additionally, it is understood that other types of retention mechanisms other than, or in addition to, a set screw could be used to couple the hub 92 to the shaft 100. Furthermore, it is contemplated that more than one opening could be formed in the hub body so that more than one set screw could be used to secure the hub 92 to the shaft 100.

When assembled, the pins 96 of the hub 92 are retained within the keyways 90 of the sprocket 78 and an alignment boss 106 formed at the end of the shaft 100 extends past the hub body 94 and into the central bore 88 of the sprocket 78. In a preferred embodiment, the alignment boss 106 has a chamfer feature 101 that fits against the chamfer wall 91 of the sprocket 78. The chamfer feature 101 thus prevents the sprocket 78 from being mounted onto the shaft 100 incorrectly. It is understood that other types of features, such as a counter-bore in the bore 88 and a shoulder on the alignment boss 106 could be used, to prevent incorrect connection of the sprocket 78 to the shaft 100.

Figure 4:
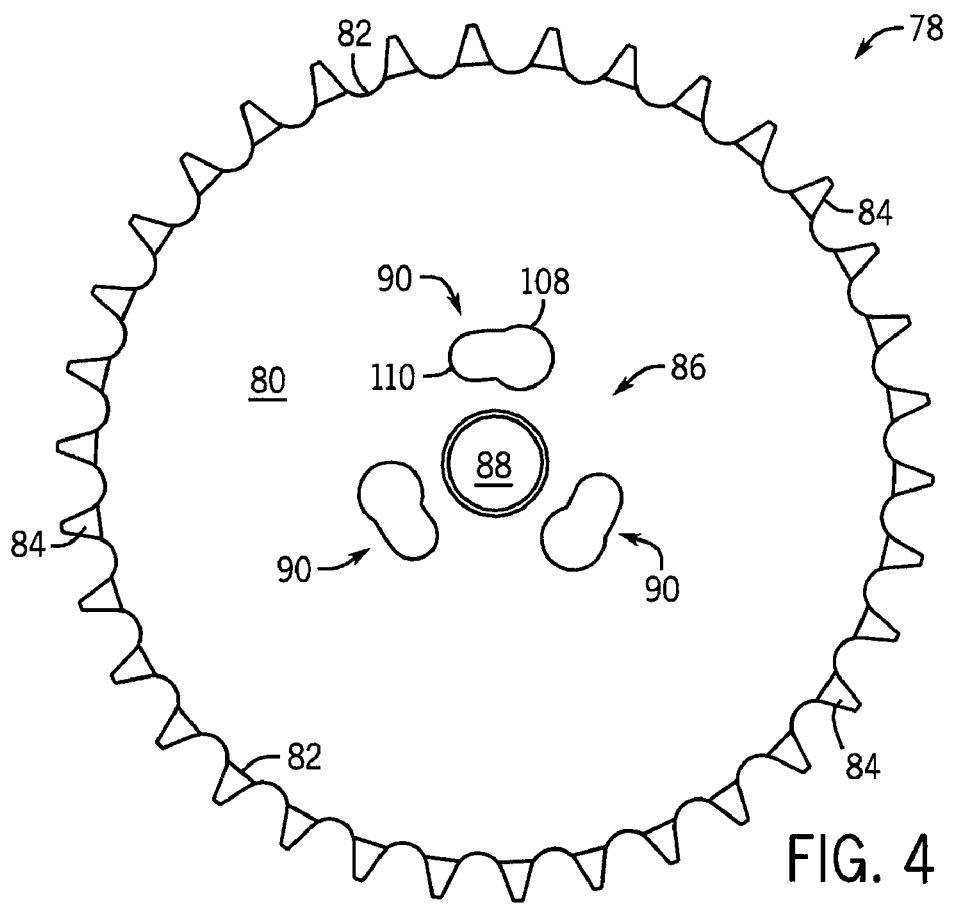
FIG. 4 is a front elevation view of the sprocket of FIG. 3.
Figure 7:
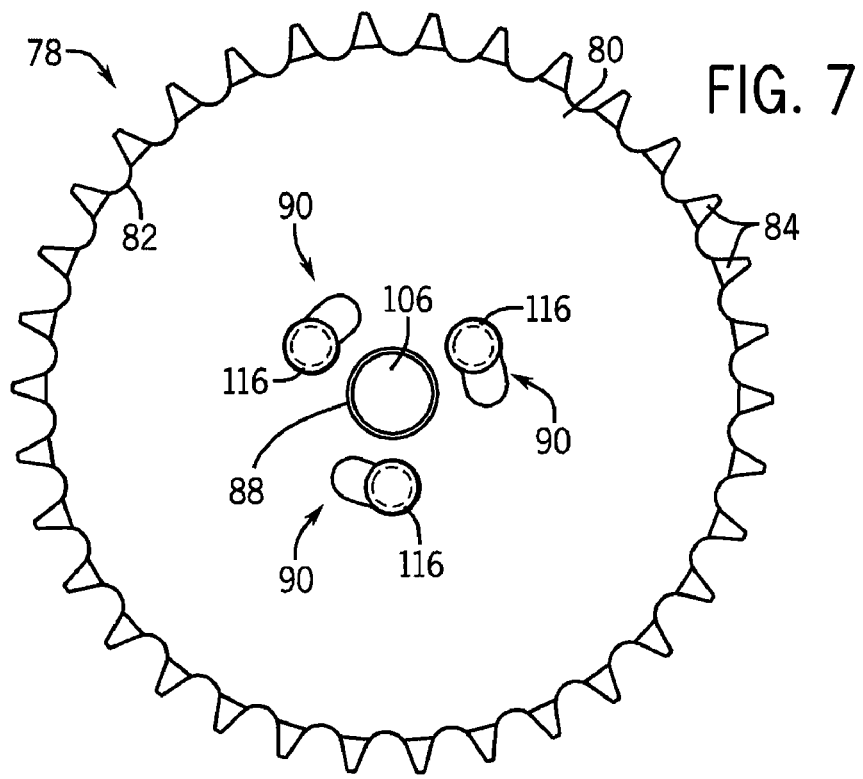
FIG. 7 is a front elevation view of the sprocket and hub with pins of the hub inserted into keyways formed in the sprocket.
Figure 8:
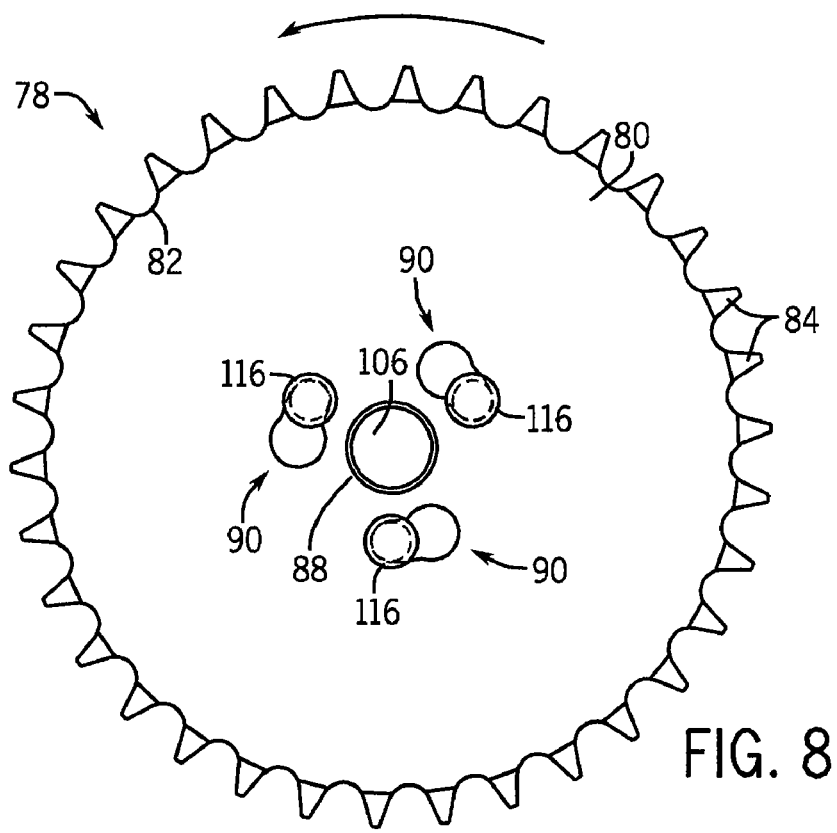
FIG. 8 is a front elevation view similar to that of FIG. 7 illustrating locking of the pins of the hub in the keyways of the sprocket upon rotation of the hub.

Referring now to FIG. 4, each of the keyways 90 of the sprocket 78 has a wide diameter portion 108 and a narrow diameter portion 110 that communicate with one another. The keyways 90 are thus formed so that the wide diameter portions 110 of the sprocket 78 are fit over the pins 96 of the hub, as shown in FIG. 7, and once the pins 96 pass through the wide diameter portions 110, the sprocket 78 (or hub 92 and shaft 100) is rotated so that the pins move from the wide diameter portions 110 to the narrow diameter portions 112, as shown in FIG. 8. To facilitate this movement of the pins 96 within the keyways 90, each pin 96 is comprised of two general portions: a post 114 and a head 116, which is illustrated in FIG. 6.

As shown in FIG. 6, the posts 114 extend outwardly from the hub body 94 and the heads 116 are formed on the distal ends of the posts 114. The posts 114 have a diameter generally less than that of the heads 116. As such, a channel or groove (not numbered) is effectively defined between the heads 116 and the hub body 94 along the posts 114. The width of this channel, or in other words, the length of the posts 114, is slightly greater than the width of the sprocket body 80. The excess length of the posts 114 allows the heads 116 to be clear of the sprocket body 80 when the sprocket 78 is fit onto the hub 92; however, the excess length is sufficiently small to maintain a snug fit of the sprocket 78 against the body 94 of the hub 92.

The detachability of the hub 92 from the sprocket 78 provides advantages over conventional integrated sprocket and hub designs. Firstly, the present invention allows a single hub to be used interchangeably with sprockets of different diameters, or gear ratios. Thus, when a user wishes to change the drive ratio of the mechanical drive system, slack can be introduced to the chain entrained around the sprocket, the sprocket detached from the hub with counter-rotation of the sprocket to move the pins 96 from the narrow diameter portions 110 to the wide diameter portions 108, and a new sprocket mounted to the hub 92. Secondly, the hub-less sprockets allows a set of sprockets to be stored on the agricultural implement as a single sprocket set 112, as shown in FIG. 2B. That is, the sprockets of the set can be placed relatively flat against one another and held on a retention arm 114 as a single unit.

While the present invention has been described with respect to a sprocket and detachable hub assembly for use with a mechanical drive system of an agricultural planter, it is understood that the invention could be used with other systems of the planter or with other types of agricultural implements in which it would be advantageous to reduce the storage of multiple sprockets and provide a sprocket and hub design that allows a single hub to be used interchangeably with multiple sprockets. Additionally, while the invention has been described with respect to roller chains and sprockets, it is understood that belts and pulleys could also be used.

Many changes and modifications could be made to the invention without departing from the spirit thereof. The scope of these changes will become apparent from the appended claims.

I claim:

1. A sprocket assembly for use with a mechanical drive assembly of an agricultural implement, comprising:
   a generally flat disc having an outer edge, a generally center mount portion and a generally circular mounting aperture extending therethrough, the mounting aperture adapted for receipt on an end portion of a driven shaft of the mechanical drive assembly;
   a series of teeth radially defined around the outer edge of the disc; and
   a hub removably mounted to the generally center mount portion of the disc, the hub including a shaft engagement portion having a non-circular mounting aperture therethrough for removably coupling the hub to the driven shaft of the mechanical drive assembly; and wherein the generally center mount portion includes a series of keyways and the hub includes a series of pins designed to be retained in the series of keyways when the hub is mounted to the disc.

2. The sprocket assembly of claim 1 wherein the keyways are arranged such that rotation of the hub and drive shaft in a first direction locks the hub to the disc.

3. The sprocket assembly of claim 2 wherein each keyway has a first diameter portion, a second diameter portion, and an interconnecting portion, and wherein each pin includes a post extending from an exterior surface of the hub, wherein the post has a first diameter, and a head member formed on an end of the post opposite the hub, wherein the head has a second diameter greater than the first diameter.

4. The sprocket assembly of claim 3 wherein each keyway is formed such that when the post is passed through the larger diameter portion to a position that the head of the post is clear of the plane of the disc and the disc is rotated in the first direction, the post is retained in the smaller diameter portion of the keyway.

5. The sprocket assembly of claim 1 wherein the series of keyways includes three keyways equiradially spaced from one another and the series of pins includes three pins equiradially spaced from one another.

6. The sprocket assembly of claim 1 wherein the hub has a passage communicating from an exterior surface of the hub to the shaft engagement portion, and further comprising a set screw adapted to secure the hub to the driven shaft.

7. A mechanical drive assembly for an agricultural implement in which rotation of a ground engaging wheel is used to provide power to a device of the agricultural implement, comprising:
   an output shaft designed to rotate with rotation of the ground engaging wheel;
   a transmission unit coupled to the output shaft and the ground engaging wheel, and designed to control rotational speed of the output shaft relative to rotational speed of the ground engaging wheel, the transmission unit including:
      a driven shaft having a first end and a second end;
      a first rotatable member supported on and rotatable about the driven shaft, the first rotatable member having a first pitch diameter;
      a first hub removably mounted to the first rotatable member and adapted to couple the first rotatable member to the first end of the driven shaft such that rotation of the first rotatable member causes rotation of the driven shaft, the hub including a shaft engagement portion having a non-circular mounting aperture there through for removably coupling the hub to the shaft of the mechanical drive assembly,
      a second rotatable member supported on and rotatable about the driven shaft, the second rotatable member having a second pitch diameter;
      a second hub removably mounted to the second rotatable member and adapted to couple the second rotatable member to the second end of the driven shaft for rotational movement therewith such that the second rotatable member rotates in response to rotation of the driven shaft, the hub including a shaft engagement portion having a non-circular mounting aperture there through for removably coupling the hub to the shaft of the mechanical drive assembly;
   a driving member interconnected between the ground engaging wheel and the first sprocket and configured to cause rotation of the first rotatable member and hub with rotation of the ground engaging wheel; and
   a driven member interconnected between the second rotatable member and the output shaft and configured to cause rotation of the output shaft with rotation of the driven shaft.

8. The assembly of claim 7 wherein the first pitch diameter is less than the second pitch diameter.

9. The assembly of claim 7 wherein the first pitch diameter is greater than the second pitch diameter.

10. The assembly of claim 7 further comprising a retention pin capable of holding a series of rotatable members, wherein each of the rotatable members is configured to be interchangeably mounted to the driven shaft by either one of the first and the second hub.

11. The assembly of claim 7 wherein each rotatable member includes:
   a generally flat disc having an outer edge and a generally center mount portion; and
   a series of teeth radially defined around the outer edge of the disc; and
   wherein each hub has:
   a shaft engagement portion for removably coupling the hub to the driven shaft of the mechanical drive assembly.

12. The assembly of claim 11 wherein the generally center mount portion includes a series of keyways and each hub includes a series of pins designed to be retained in the series of keyways when the hub is mounted to the disc.

13. The assembly of claim 12 wherein the keyways are arranged such that rotation of the hub and driven shaft in a first direction locks the hub to the disc.

14. The assembly of claim 13 wherein each keyway has a first diameter portion, a second diameter portion, and an interconnecting portion, and wherein each pin includes a post extending from an exterior surface of the hub, wherein the post has a first diameter, and a head member formed on an end of the post opposite the hub, wherein the head has a second diameter greater than the first diameter.

15. The assembly of claim 13 wherein each keyway is formed such that when the post is passed through the larger diameter portion to a position that the head of the post is clear of the plane of the disc and the disc is rotated in the first direction, the post is retained in the smaller diameter portion of the keyway.

16. A kit of sprocket assemblies for use with a mechanical drive assembly of an agricultural implement, comprising:
   a mounting rod;
   a set of sprockets removably stored on the mounting rod, each sprocket having a generally flat disc with an outer edge and center mount portion; and
   a hub interchangeably usable with each of the sprockets, and configured to be removably mounted to the center mount portion of a disc and further configured to couple the sprocket to a drive shaft of the mechanical drive assembly;
   wherein the discs of at least two sprockets of the set of sprockets have diameters, the diameters of the discs of the at least two sprockets of the set of sprockets being different.

17. The kit of claim 16 wherein each sprocket has a series of teeth formed along the outer edge, and the center mount portion includes a series of radially oriented equally spaced keyways, and wherein the hub includes a series of pins adapted to be removably retained in the keyways to couple the hub to the sprocket.

18. The kit of claim 16 wherein the hub has an axial mounting portion adapted to be removably coupled to a driven shaft of the mechanical drive assembly and a radially mounting portion to removably engage a sprocket to interconnect the sprocket with the driven shaft.

19. The kit of claim 16 wherein each sprocket has three radially spaced keyways and the hub has three radially spaced ports adapted to engage the three keyways of a sprocket when the sprocket is coupled to the hub.

* * * * *